Oct. 11, 1949.  W. P. WILLS ET AL  2,484,367
STANDARDIZED MOTOR CONTROL SYSTEM
Filed April 26, 1944  4 Sheets-Sheet 1

INVENTOR.
WALTER P. WILLS
LEONARD STANTON
BY
*C. B. Stangenberg*
ATTORNEY.

Oct. 11, 1949.    W. P. WILLS ET AL    2,484,367
STANDARDIZED MOTOR CONTROL SYSTEM
Filed April 26, 1944    4 Sheets-Sheet 2

*INVENTOR.*
WALTER P. WILLS
LEONARD STANTON
BY
*E. O. Spangenberg*
ATTORNEY.

Oct. 11, 1949.      W. P. WILLS ET AL      2,484,367
STANDARDIZED MOTOR CONTROL SYSTEM
Filed April 26, 1944      4 Sheets-Sheet 3
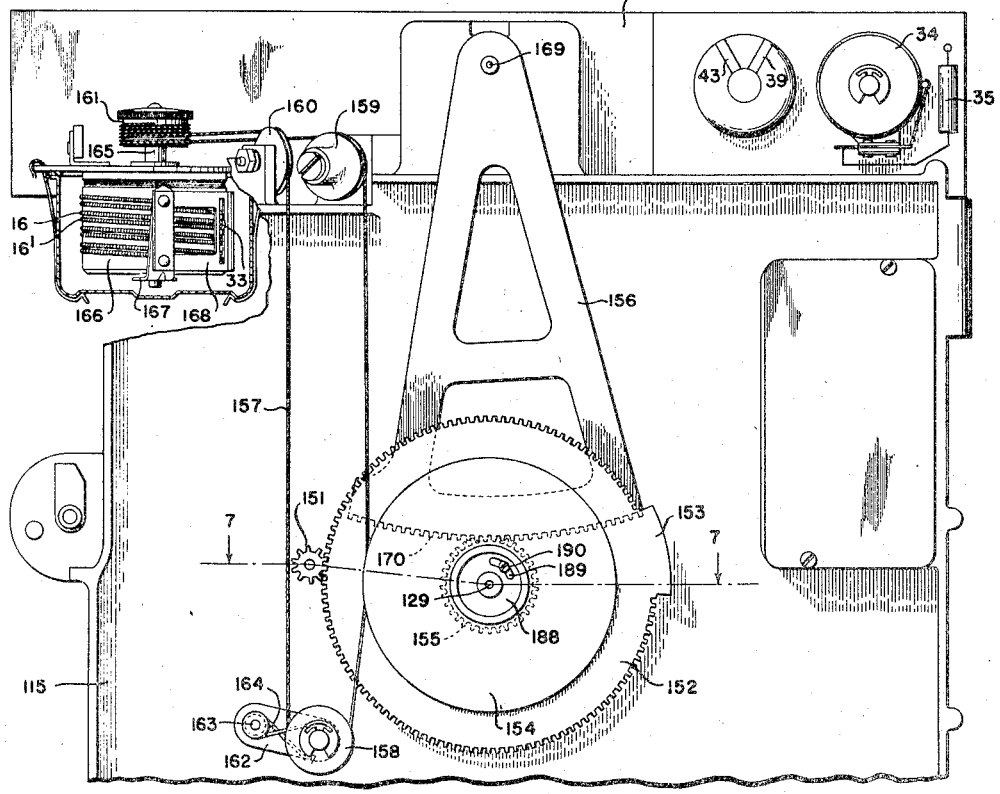
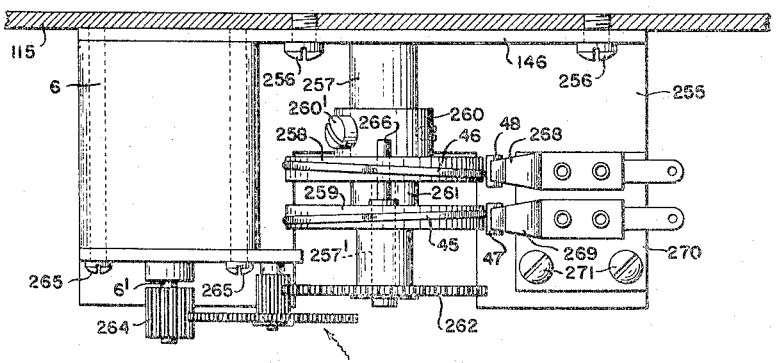
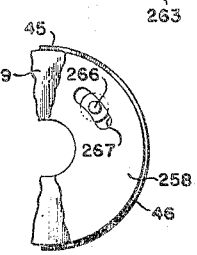
INVENTOR.
WALTER P. WILLS
LEONARD STANTON
BY
ATTORNEY.

Oct. 11, 1949.    W. P. WILLS ET AL    2,484,367
STANDARDIZED MOTOR CONTROL SYSTEM

Filed April 26, 1944    4 Sheets-Sheet 4

INVENTOR.
WALTER P. WILLS
LEONARD STANTON
BY
ATTORNEY.

Patented Oct. 11, 1949

2,484,367

UNITED STATES PATENT OFFICE 2,484,367

STANDARDIZED MOTOR CONTROL SYSTEM

Walter P. Wills, Germantown, and Leonard Stanton, Philadelphia, Pa., assignors, by mesne assignments, to Minneapolis-Honeywell Regulator Company, Minneapolis, Minn., a corporation of Delaware Application April 26, 1944, Serial No. 532,738

18 Claims. (Cl. 318—28)

1

The present invention relates to systems involving the measurement of small electric currents and their utilization for indicating, recording and control purposes. The invention has particular utility in continuously measuring and/or recording the minute unidirectional currents produced by a spectrophotometer employed to apply ultra-violet or other spectra to the identification and analysis of chemical compounds and mixtures.

A general object of the invention is to provide a highly sensitive and stable arrangement for continuously indicating and/or recording extremely small unidirectional currents. It is also an object of the invention to provide such an arrangement for measuring extremely small unidirectional currents which flow in high resistance circuits.

Another object of the invention is to provide a highly sensitive and stable arrangement for continuously exhibiting the chemical composition and the variations in chemical composition of compounds and mixtures having characteristic spectra in the ultra-violet region.

The usefulness of spectroscopic phenomena in chemical analysis and in control procedures is gaining increased recognition by the industries, particularly the petroleum industry, because of its unique ability to differentiate between isomeric and other closely related chemical compounds and also because of its speed and sensitivity of response. Thus, it previously has been proposed to apply infra-red and ultra-violet spectra to the identification and analysis of chemical compounds and mixtures. Each of these spectroscopic methods of analyses offers something to the analyst that is not to be found in the other, and hence, the necessity of making a choice between these two methods should never need arise. For example, the infra-red spectra are more characteristic of specific atomic groups, atomic orientation, and of atoms in a singular sense. Ultra-violet spectra, on the other hand, are more characteristic of the molecules as a whole, small molecular configuration with the figuration of larger molecules, and changes in molecular electromagnetic energies.

Substances such as butane and isobutane while having the same molecular formulae produce markedly different infra-red spectra due to the change in atomic configuration. As the wavelengths employed are decreased, however, the spectra gradually become more characteristic of the molecule as a whole. Thus the very short wavelengths of ultra-violet are individually characteristic of molecules.

2

One important application which has been found for the ultra-violet spectra is the identification and analysis of olefins and aromatic compounds as impurities in mixtures. The olefins and aromatic compounds have sharp identifying absorption bands in the ultra-violet spectrum and the wavelengths at which each absorbs are separated sufficiently to allow quantitative analysis of any one compound in a mixture of other compounds.

A specific object of the invention is to provide a highly sensitive and stable arrangement for continuously measuring and exhibiting the quantitative absorption and variations therein of a continuously flowing specimen of a compound or mixture under analysis flowing through an absorption cell and having absorption bands in the ultra-violet spectrum.

In the prior art attempts have been made to make quantitative analyses of the absorption of separate specimens of a compound or mixture having absorption bands in the ultra-violet spectrum by employing a photoelectric cell as the sensitive element and by utilizing a D. C. vacuum tube amplifier to amplify the photoelectric cell current variations to a value sufficiently great to actuate a sensitive but delicate deflecting type indicating instrument. The usefulness of such prior art arrangements has been limited, however, by the delicate nature and inherent disadvantages of the indicating instrument as well as by the instability of D. C. vacuum tube amplifiers. A further and serious limitation of the prior art arrangements is their inability to provide a continuous record of the absorption variations of a continuous flow of the compound or mixture under analysis. The primary causes of instability of D. C. vacuum tube amplifiers are changes in vacuum tube characteristics, changes in tube filament emissions, changes in contact potentials, mechanical vibration, inadequate shielding, drifts in supply voltages, changes in value of resistance and other components, and temperature and humidity effects. These variable and unpredictable factors cause troublesome drifts and erratic operation of the apparatus, as do also changes in the photoelectric cell "dark" current.

Accordingly, it is a primary object of the present invention to provide an arrangement operable to measure the current variations established in a photoelectric cell due to the variations in absorption of a continuously flowing specimen of a compound or mixture under analysis through an absorption cell and having a sensitivity at least comparable to that of the prior art arrangements and having the added and practically important advantages of being substantially free from drift and troublesome fluctuations. It is also an object of the invention to provide such an improved arrangement which is not appreciably influenced by conditions such as vibration, humidity and temperature.

To the attainment of these objects suitable provisions are incorporated in the apparatus of our invention for periodically accomplishing at suitably close intervals a standardizing or calibrating operation to compensate for drifts in the vacuum tube detecting amplifier and also for compensating for changes in the photoelectric cell "dark" current.

It is a further object of the invention to provide a novel and improved arrangement and sequence of operations for accomplishing such standardizing or calibrating adjustments.

It is also an object of the invention to provide such an improved arrangement which is rugged in construction and in which the exhibiting element is power driven by reversible motor means.

The various features of novelty which characterize our invention are pointed out with particularity in the claims annexed to and forming a part of this specification. For a better understanding of the invention, however, its advantages and specific objects attained by its use, reference should be had to the accompanying drawings and descriptive matter in which we have illustrated and described preferred embodiments of the invention.

Of the drawings:

Fig. 3 is an elevational view of the back of the swinging frame with a portion of the frame broken away;

Fig. 5 is a top view of the photoelectric cell "dark" current standardizing rheostat and its driving reversible motor; and Fig. 6 is a detail view showing the connection between the coarse and fine resistances of the standardizing rheostat.

Figure 1:
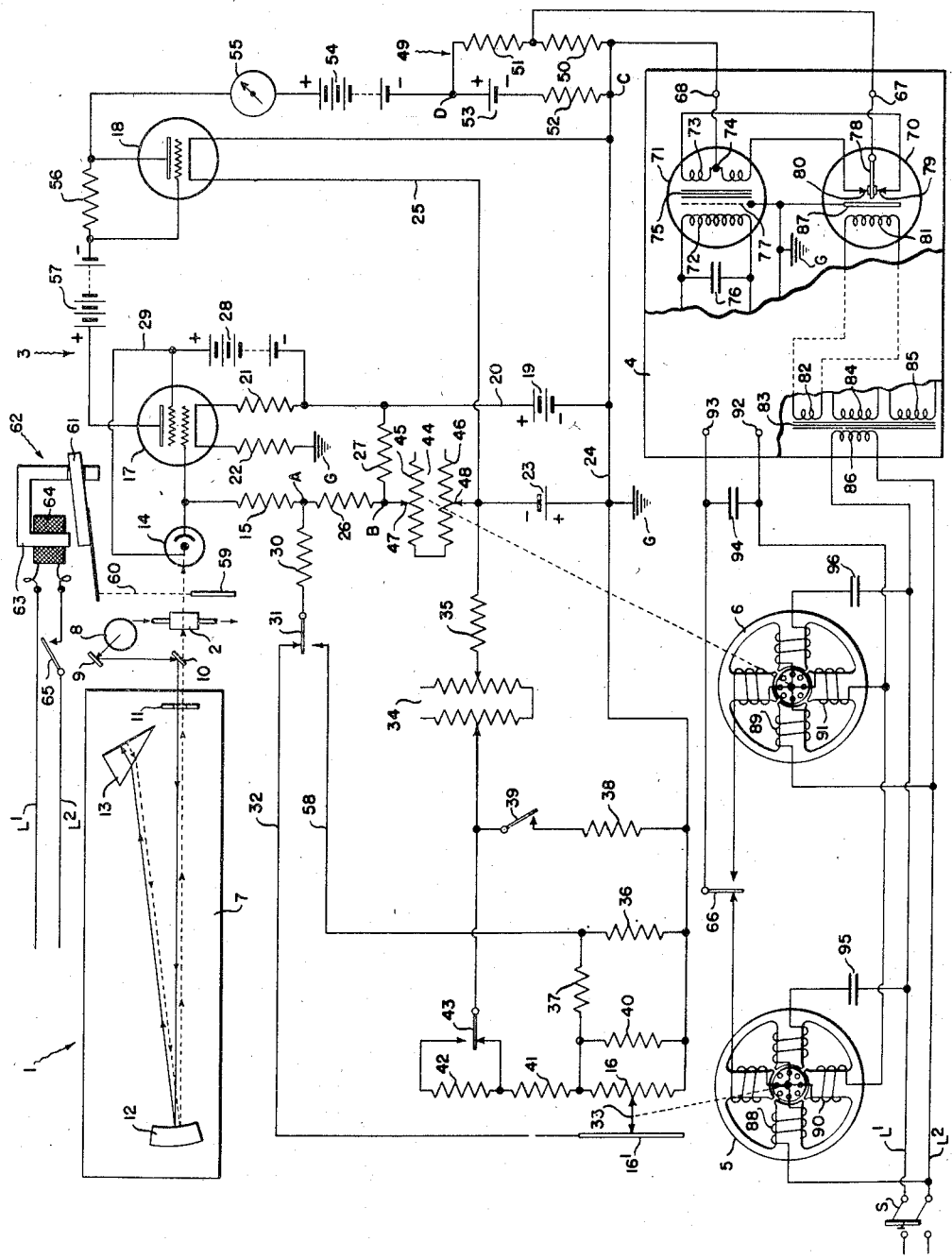
Fig. 1 is a diagrammatic illustration of a preferred embodiment of the invention for continually recording the chemical composition of compounds and mixtures having characteristic spectra in the ultra-violet region.

In Fig. 1 we have illustrated more or less diagrammatically the improved apparatus of our invention for measuring and indicating or recording the variations in chemical composition of compounds and mixtures having characteristic spectra in the ultra-violet region. The apparatus includes a photoelectric quartz spectrophotometer which has been indicated generally by the reference numeral 1, an absorption cell 2 through which a flow of the compound or mixture under analysis is continuously maintained, an electronic preamplifier circuit which has been generally indicated by the reference character 3, an electronic conversion amplifier and motor drive system 4, a recording pen or other exhibiting element driving motor 5 and a photoelectric cell "dark" current standardizing or calibrating motor 6. The motor 5 also effects the required instrument follow-up or rebalancing operations.

The quartz spectrophotometer which includes a monochromator 7 may be of and has been shown as of the type contained in the commercially available Beckman photoelectric quartz spectrophotometer Model 9101. The optical system of the monochromator is schematically shown in Fig. 1 and as shown includes a source of ultra-violet light such as a hydrogen lamp which has been indicated schematically by the numeral 8, a condensing mirror 9, a 45° diagonal mirror 10, an opaque shield member 11 provided with two vertically displaced slits, a collimating mirror 12 and a rotatable quartz prism 13. An image of the ultra-violet light produced by the lamp 8 is focused by the condensing mirror 9 and the 45° mirror 10 on the plane of the slits in the shield 11. The entrance slit is the lower one of the two vertically displaced slits. Light falling on the collimating mirror 12 is rendered parallel and reflected toward the quartz prism 13. The back surface of the quartz prism is aluminized and reflects the ultra-violet light falling on it so that light reflected at the first surface of the prism is returned along the same path, undergoing further refraction as it emerges from the prism as a parallel beam. This parallel beam is again reflected from the collimating mirror 12 and focused in a spectrum in the plane of the slits in the shield 11. Ultra-violet light of predetermined wavelength determined by the angular position of the quartz prism 13 passes out of the monochromator through the upper slit in the shield 11. In one satisfactorily operating embodiment of the invention the quartz prism 13 is so adjusted that the wavelength of the ultra-violet light passing out of the upper slit of the member 11 is 235 millimicrons. This monochromatic light is passed through the absorption cell 2 to a photoelectric cell 14. The photoelectric cell 14 may desirably be of the commercially available RCA type C7032. It has been found that a photoelectric cell of this type is especially advantageous in measuring wave lengths below 625 millimicrons. When longer wavelengths are to be detected an RCA type 919 may be utilized.

Ultra-violet monochromatic radiation passing through the absorption cell 2 is absorbed by the continuously flowing specimen of the compound or mixture in the absorption cell depending upon the molecular characteristics of the said compound or mixture, and consequently, the illumination of the photoelectric cell 14 is varied in accordance with the variations in those molecular characteristics.

The electronic preamplifier circuit 3 is utilized to amplify the electric current flow established in the photoelectric cell 14 and to detect variations in that flow, and hence, to provide a means for ascertaining the absorption characteristics of the compound or mixture under analysis. Specifically, the current established in the photoelectric cell 14 is measured by balancing the voltage drop developed across a resistance 15 with a variable portion of the potential drop developed across a slidewire potentiometer resistance 16. The resistance 15 is preferably a high resistance having a value of approximately 2000 megohms. In order to minimize leakage, mounting means having exceptionally good insulating qualities are desirable. In addition, suitable desiccating means are provided within the enclosure housing the resistance 15 to minimize leakage due to humidity effects.

The electronic preamplifier circuit 3 includes an electronic valve 17 which may be an electrometer tube of the commercially available type 32E and it is also provided with an electronic valve 18 which may be an amplifier tube of the commercially available type 30. The electronic valve 17 is a tetrode having anode, screen, control electrode and cathode elements, and the valve 18 is a triode having anode, control electrode and cathode elements. The cathode elements in each valve constitute heater filaments which receive energizing current from suitable sources of direct current. Thus the heater filament of valve 17 receives energizing current from a battery 19 through a circuit which may be traced from the positive terminal of the battery 19 through a conductor 20 in which a resistance 21 is inserted, through the heater filament, through a resistance 22 to ground G and a conductor 24 to the negative terminal of a battery 19. Energizing current is supplied the heater filament of valve 18 from a battery 23 through a circuit which may be traced from the positive terminal of battery 23 to the grounded conductor 24, the heater filament and through a conductor 25 to the negative terminal of battery 23.

The input circuit of the valve 17 is controlled by the photoelectric cell 14 and may be traced from the control electrode of the valve 17 through the resistance 15, a resistance 26, a resistance 27, and resistance 21 to the cathode of valve 17. Preferably, the resistance 15 is supported at its end A which is closest in impedance path to ground by a suitable insulating strip and the other end is directly connected by a fine wire to the control electrode of valve 17. A variable potential drop is created across the resistance 15 by the flow of photoelectric cell current which is established through the photoelectric cell and the resistance 15 by means of a circuit which may be traced from the positive terminal of a battery 28 through a conductor 29 to the anode of the photoelectric cell 14, the cathode thereof, and resistances 15, 26 and 27 to the negative terminal of battery 28.

Substantially all of the potential drop created by the flow of photoelectric cell current is produced across the resistance 15 inasmuch as this resistance has a value of 2000 megohms while the resistances 26 and 27 have values of 1 megohm and 168.2 ohms, respectively. Hence, the potential at the point A is substantially unaffected by current variations in resistance 15.

Due to variations in the "dark" current conducted by the photoelectric cell 14 and also due to other factors such as variations in grid current flows in the electronic valve 17, the potential of the control electrode of valve 17 tends to slowly drift, even when the illumination of photoelectric cell 14 is constant, and therefore, it is necessary from time to time to make a standardizing or calibrating adjustment to restore the potential of the said control electrode to its original value. The manner in which such a compensating adjustment is made is explained in detail hereinafter. At this point it is sufficient to note that such compensation is accomplished by correspondingly varying the potential at the point A.

As previously noted, the potential drop created across the resistance 15 is balanced against a variable portion of the potential drop established across a slidewire potentiometer resistance 16. To this end the point A is connected by means of a resistance 30, a single pole-double throw switch 31, a conductor 32 and a collector bar 16¹ to the sliding contact 33 of the slidewire potentiometer resistance 16. The lower end of the slidewire potentiometer resistance 16 is connected through the grounded conductor 24, the battery 19, and the resistance 21 to the cathode of the valve 17. Hence, the potential drops created across the resistances 15 and 16 are connected in series opposition to each other between the control electrode and the cathode of the valve 17.

It is noted that the potential drops established across the resistance 21 and the resistance 22 by the filament energizing current flow from the battery 19 operate as biasing potentials to normally maintain the potential of the cathode of valve 17 at a predetermined value above the potential of the grounded conductor 24. Preferably the resistances 21 and 22 have values of 47 ohms and 49 ohms, respectively, and the voltage of battery 19 is four volts. Consequently, the cathode of valve 17 will be maintained at a potential approximately 2 volts positive with respect to the potential of the grounded conductor 24.

The battery 23 which is utilized to supply energizing current to the filaments of the electronic valve 18 also is employed to establish a current flow through the potentiometer slidewire resistance 16. The battery 23 desirably may be a 2 volt battery and the circuit to the slidewire 16 may be traced from the positive terminal of the battery 23 through the grounded conductor 24 to a parallel network consisting of two branches, through that network, and through an adjustable resistance or vernier rheostat 34 and a resistance 35 to the negative terminal of the battery 23. The parallel network includes a resistance 38 and a single pole-single throw switch 39 in one branch, and the slidewire resistance 16 in the second branch. The second branch also includes a resistance 40 which is connected in shunt to the slidewire resistance 16, and a pair of series connected resistances 36 and 37, also in shunt to the resistance 16. In addition, the second branch includes a pair of resistances 41 and 42 which are arranged to be connected in series with the parallel connected resistances. A single pole-double throw switch 43 is provided to connect either the resistance 41 alone in series with the parallel connected resistances in the second branch or to connect both of the resistances 41 and 42 in series with each other and with the parallel connected resistances in the second branch.

The switches 39 and 43 and the associated resistances 38 and 42 are provided for varying the absorption range of the compound or mixture under analysis over which the sliding contact 33 moves along the entire length of the slidewire resistance 16. When the switch 43 is in engagement with its lower contact to connect only the resistance 41 in the second branch of the parallel network, the switch 39 is adjusted to its open position. When the switch 43 is in its upper position and connects both of the resistances 41 and 42 in the second branch of the parallel network, the switch 39 is adjusted to its closed position to connect the resistance 38 into the parallel network. Preferably, therefore, the switches 39 and 43 are ganged together for simultaneous operation. The value of resistance 38 is so selected in relation to the values of resistances 16, 36, 37, 40, 41 and 42 that when resistance 42 is connected into the second branch of the parallel network the connection of the resistance 38 into the first branch of the parallel network is operative to compensate for the added resistance in the second branch so that the total resistance presented by the parallel network remains constant. Consequently, the current drain from the battery 23 is the same whether the resistance 42 is in or out of the second branch of the parallel network. Moreover, no change need be made in the adjustment of the vernier rheostat 34 when the shift from one range to the other is made. The rheostat 34 comprises a sensitivity adjustment for varying the sensitivity of response of the motion of the sliding contact 33 along the length of the slidewire resistance 16 for a given change in absorption of the compound or mixture in the absorption cell 2.

The means for effecting the required compensating adjustments in the potential of the point A to compensate for the potential variations produced across the resistance 15 due to changes in the "dark" current flow of the photoelectric cell 14 and for the changes in the grid current flow of valve 17 comprise a variable resistance 44 which is connected between the point B of engagement of the resistances 26 and 27 and the negative terminal of the battery 23. The adjustable resistance 44 comprises a vernier rheostat having two slidewire resistances 45 and 46 and respectively associated contacts 47 and 48. The slidewire resistance 45 comprises a vernier or a fine adjustment and the slidewire resistance 46 constitutes a coarse adjustment. Hence, extremely small changes in the total value of the resistance 44 may be made. The value of resistance 44 is automatically adjusted by the standardizing motor 6 in a manner to be described. The mechanical construction of the vernier rheostat 44 is also explained hereafter.

Referring to Fig. 1 of the drawing, it will be noted that the batteries 19 and 23 are connected in a closed circuit which may be traced from the grounded conductor 24 through the battery 19, the resistance 27, the vernier rheostat 44, and the battery 23 back to the grounded conductor 24. The batteries 19 and 23 are connected in assisting relation in this closed loop. The vernier rheostat 44 is so designed as to be variable in resistance from 0 to 116 ohms.

When the vernier rheostat 44 is adjusted to its zero value, it will be apparent that the total voltage of the batteries 19 and 23 will be dissipated through the resistance 27. Hence, in this case a voltage drop of 6 volts will be produced across the resistance 27, the combined voltage of the batteries 19 and 23 being 6 volts. The potential of the point B will then be substantially 2 volts negative with respect to the potential of the grounded conductor 24. When the vernier rheostat is adjusted to the position where it presents 116 ohms resistance, the potential of the point B will be approximately 0.44 volt positive with respect to the potential of the grounded conductor 24. As the vernier rheostat is adjusted from its zero value to its maximum value, the potential of the point B will gradually vary from a potential of 2 volts negative with with respect to the potential of the conductor 24 to the value of 0.44 volt positive with respect to the potential of the grounded conductor. It will be evident that as the potential of the point B is so raised or lowered with respect to the potential of the grounded conductor 24 that the potential of the point A will be correspondingly raised or lowered with respect to the potential of the grounded conductor 24. Accordingly, the variations in potential drop across the resistance 15 caused by photoelectric cell "dark" current variations and also by changes in the grid current flow in the valve 17 will be compensated for by adjustment of vernier rheostat 44.

The output or anode circuit of the valve 17 is resistance coupled to the input circuit of the valve 18. The anode circuit of the valve 17 may be traced from the grounded conductor 24 through a parallel circuit 49 including a pair of series connected carbon resistances 50 and 51 in one branch and a carbon resistance 52 and a battery 53 in the second branch, to the negative terminal of a battery 54, from the positive terminal thereof through a milliammeter 55, a resistance 56, the negative terminal of a battery 57, from the positive terminal of the battery 57 to the anode of valve 17 and from the cathode thereof through resistance 21, conductor 20 and battery 19, back to the grounded conductor 24. The flow of anode current of valve 17 through this circuit creates a potential drop across the resistance 56 which varies in accordance with the variations in illumination of the photoelectric cell 14 and thereby in accordance with the changes in absorption of the compound or mixture under analysis in the absorption cell 2.

The potential drop so created across the resistance 56 is impressed between the anode and the control electrode of the valve 18, the positive terminal of resistance 56 being connected to the anode and the negative terminal being connected to the control electrode. Accordingly, the electronic valve 18 is arranged to have its conductance varied in correspondence with the variations in absorption of the compound or mixture in the cell 2. The anode circuit of the valve 18 may be traced from the grounded conductor 24 through the parallel network 49, the battery 54, milliammeter 55 and the anode to cathode circuit to the grounded conductor 24.

The operation of the photoelectric preamplifier circuit 3 will now be described. When no light impinges on the photoelectric cell 14, a potential drop will be created across the resistance 15 corresponding to the existing photoelectric cell "dark" current flows and the grid current flows of valve 17. This potential drop ordinarily is very small in magnitude, and hence, the potential of the control electrode of valve 17 will be substantially the same as that of the potential of the point A. The sliding contact 33 will then be near the lower end of the slide wire resistance 16 in order to balance out the voltage across resistance 15.

With the voltage tapped off resistance 16 at the proper value to balance out the voltage drop across the resistance 15, the conductivity of the valve 17 will be a predetermined value, and accordingly, a current flow of corresponding magnitude will be conducted by the valve 18. When the batteries 28, 54 and 57 have voltages of 15, 19.5 and 15 volts, respectively, and the resistances 50, 51, 52 and 56 have values of 100 ohms, 100,000 ohms, 5,000 ohms and 1 megohm, respectively, the current flow conducted by the valve 18 will be exactly 0.3 milliampere.

When the photoelectric cell 14 is illuminated the current flow through the resistance 15 will be increased, causing the potential of the control electrode of the valve 17 to rise further above the potential of the point A. This change in potential of the control electrode is effective to cause an increase in the conductivity of the valve 17, and consequently to cause an increase in the potential drop across the resistance 56. The increase in potential drop across resistance 56 causes a decrease in the conductivity of the valve 18, and, therefore, a reduction in the current flow through the parallel network 49. The reduction in current flow through the parallel network 49 is detected by the electronic amplifier and motor-drive system 4 in a manner to be described, and is employed to cause the motor 5 to move the contact 33 in an upward direction to increase the amount of the slidewire voltage which opposes the potential drop across the resistance 15 until the potential of the control electrode of valve 17 is restored to its original value. When the sliding contact 33 has been so adjusted the motor 5 will come to rest.

The slidewire resistance 16 is so designed that the slidewire voltage-contact movement relationship is a linear one. In addition, the resistance 15 is so selected as to be very stable. When these elements are so arranged and selected, a linear photoelectric cell current versus slidewire movement is obtained. On the assumption that light source 8 maintains a constant intensity, the deflection of contact 33 along slidewire resistance 16 then will be a linear function of the transmission of the monochromatic radiation through the absorption cell 2.

At suitably frequent intervals the switch 31 is adjusted to its lower position to disconnect the point A in the input circuit of valve 17 from the sliding contact 33 and to connect point A to the point of engagement of resistances 36 and 37. The circuit connecting the point A to that point of engagement may be traced from the point A through the resistance 30 and through a conductor 58 to the point of connection of resistances 36 and 37. The resistance 36 may desirably have a value of one ohm and the resistance 37 may have a value of 96 ohms. The resistance 36 is so chosen in value as to present exactly the same potential as that existing between the grounded conductor 24 and the sliding contact 33 when the sliding contact is in its zero position. It will be apparent that when the sliding contact 33 is in its zero and lowermost position that the sliding contact will not necessarily be at the lower end of the slidewire, and may actually be in engagement with the slidewire resistance at a position displaced by several convolutions from the end of the slidewire resistance. In order to guard against inaccuracy from this cause the zero position of the slidewire may conveniently be made to correspond to a position at which the potential between the grounded conductor 24 and the contact 33 is exactly the same as that of the potential drop across resistance 36. In this manner the need for accurate construction and of close tolerances of the slidewire resistance 16 may be eliminated.

The arrangement of Fig. 1 also includes suitable means for moving a shutter 59 between the absorption cell 2 and the photoelectric cell 14 whenever a standardizing or calibrating adjustment of the vernier rheostat 44 is to be made. As shown, the shutter 59 is suspended by means of a fine wire 60 from the movable end of the armature 61 of a relay generally designated by the reference numeral 62. The relay 62 includes a U-shaped yoke member 63 to which one leg of the armature 61 is pivotally connected and on the other leg of which a coil 64 is wrapped. The coil 64 is connected through a single pole-single throw switch 65 to alternating current supply conductors L¹ and L² which desirably supply 110 volt, 60 cycle alternating current.

When the relay coil 64 is deenergized the armature 61 and the shutter 59 are actuated by gravity or suitable spring means, not shown, into the position shown in Fig. 1. In that position the shutter 59 and the supporting wire therefor do not intercept any of the radiation emanating from the absorption cell 2 and impinging on the photoelectric cell 14. When the relay coil 64 is energized, as when the switch 65 is moved to its closed position, the armature 61 is actuated in the upper direction and raises the shutter 59 to a position in which it intercepts all of the radiation impinging on the photoelectric cell 14 from absorption cell 2. Preferably the photoelectric cell 14 is contained within a suitable housing, not shown, so that when the shutter 59 is adjusted to its raised position all illumination is cut off from the photoelectric cell 14. In other words, the photoelectric cell 14 is then totally dark.

In the normal operation of the apparatus the switch 31 is in its upper position, the switch 65 is in its open position and the motor 5 is energized by the electronic amplifier and motor-drive system 4 to position the sliding contact 33 along the length of the slidewire resistance 16 in accordance with the variations in the absorption spectra of the compound or mixture under analysis. As shown, a single pole-double throw switch 66, is provided in the output circuit of the electronic amplifier and motor-drive system 4 for selectively connecting the control winding of the motor 5 or the control winding of the standardizing or calibrating motor 6 to the output circuit of the device 4. As is explained in detail hereinafter, the switches 31, 65 and 66 are automatically operated by means to be described, at suitable intervals, for example, at 15 minute intervals, to accomplish the necessary standardizing or calibrating adjustments. Preferably the switches 31, 65 and 66 are maintained in their standardizing or calibrating positions for an interval of the order of one minute.

As those skilled in the art will understand, in order to avoid false actuation of either or both of the motors 5 and 6, the switches 31, 65 and 66 should be operated simultaneously from their normal operating or running positions to their standardizing or calibrating positions. In practice, however, it is extremely difficult to obtain sufficient simultaneity of switching of three switches. Therefore, the apparatus of this embodiment of our invention has been arranged to accomplish the order of switching operations immediately following, which avoids false actuation of the motors 5 and 6 and eliminates the need for simultaneity of switching. The switch 66 is first operated to connect the standardizing motor to the output circuit of the electronic amplifier and motor-drive system 4. This prevents adjustment of the sliding contact 33 along the length of the slidewire resistance 16 if a standardizing or calibrating adjustment is required since the switches 31 and 65 have not yet been actuated to adjust the preamplifier circuit to its standardizing or calibrating condition. It is noted that if a false adjustment is given the sliding contact 33 at the beginning of the standardizing operation that such false adjustment will persist during the entire standardizing period and be indistinguishable from a normal change in the condition under analysis. Operating switch 66 first also prevents a destandardizing or decalibrating adjustment of the instrument from being made which will have any adverse effect upon the operation of the instrument. The shutter relay switch 65 and the measuring circuit switch 31 are then actuated, preferably, at the same time. It will be noted that in the event the switches 31 and 65 are not actuated at precisely the same instant that no harm will be done inasmuch as any operation of the standardizing or calibrating motor 6 which may result from the lack of simultaneity of operation will be immediately compensated for as soon as both switches 31 and 65 have been operated. When the standardizing or calibrating interval has expired the switch 66 is again operated first to connect the driving motor 5 to the output circuit of the electronic amplifier and motor-drive system 4, and thereafter the switches 31 and 65 are actuated at the same time to their running positions. Since perfect simultaneity of operation of the switches 31 and 65 is not possible, the motor 5 may actuate the sliding contact 33 along the length of the slidewire resistance 16, but immediately upon completion of the operation of both switches 31 and 65, the sliding contact 33 will be adjusted to its correct position of balance. Such movement of the sliding contact 33 along the length of resistance 16, therefore, will be slight and have no adverse effect upon the operation of the instrument. Moreover, it will be readily distinguishable from a change in the condition under analysis. It should be noted that the standardizing or calibrating motor 6 will be precluded, when this manner of switching is utilized, from making any false adjustments of the vernier rheostat 44 during the switching operation.

In accordance with the present invention the battery 53 is so connected in the parallel network 49 that its polarity is opposite to that of the potential drop produced across the resistance 52 by the flow of anode current through the valve 18. Its value is so chosen that when the anode current flow through the valve 18 is 0.3 milliampere, the normal anode current flow when the photoelectric cell 14 is dark or the sliding contact 33 is in the position along the length of slidewire resistance 16 corresponding to the contemporaneous illumination of the photoelectric cell, the voltage of battery 53 will be exactly equal and opposite to the potential drop created across resistance 52. Thus the voltage of battery 53 may be 1.5 volts when the value of resistance 52 is 5,000 ohms and the values of resistances 50 and 51 are 100 ohms and 100,000 ohms, respectively. With such normal anode current flow through valve 18, the potential of the network point C will be the same as that of the network point D, and therefore, no current will then flow through the resistances 50 and 51. Consequently, no voltage drop will then be produced across the resistances 50 and 51.

Upon change in illumination of the photoelectric cell 14 or change in the potential of the control electrode of valve 17 with respect to the potential of its associated cathode for any other reason, the anode current flow through valve 18 will be increased or decreased, depending upon the direction of the change in potential of the control electrode of valve 17, by an amount corresponding to the extent of the change in potential. As a result the balance between the voltage of the battery 53 and the voltage drop across resistance 52 will be disturbed and a unidirectional current flow will then be established in the upward or downward direction through the resistances 50 and 51 accordingly as the anode current of valve 18 is increased or decreased, respectively.

In this manner a unidirectional voltage drop of one polarity is created across the resistances 50 and 51 when the potential of the control electrode of valve 17 is made less negative, and a unidirectional voltage drop of the opposite polarity is created across the resistances 50 and 51 when the potential of the control electrode of valve 17 is made more negative. Stated differently, upon increase in the illumination of the photoelectric cell 14 the voltage drop produced across resistances 50 and 51 will be of the polarity rendering the upper potential point D positive with respect to the lower potential point C. Upon decrease in the illumination of photoelectric cell 14 the voltage drop across resistances 50 and 51 will be of the opposite polarity.

The terminals of resistance 50 are connected to the input terminals 67 and 68 of the electronic amplifier and motor-drive system 4. Thus the voltage drop of one polarity or of opposite polarity created across resistance 50 upon change in the illumination of photoelectric cell 14 is impressed on the input circuit of the device 4 and is utilized to selectively control the energization of the motor 5 or the motor 6 for rotation, depending upon the adjustment of switch 66, as required to effect a follow-up adjustment of the sliding contact 33 along the length of slidewire resistance 16 or to effect a standardizing or calibrating adjustment of the vernier rheostat 44. The magnitude of each adjustment corresponds to the change in potential of the control electrode of valve 17 which initially gave rise to the creation of the voltage drop across resistance 50.

The electronic amplifier and motor-drive system 4 includes a vibrator or equivalent device designated at 70 and a transformer 71 which are connected to each other and also to the input terminals 67 and 68 and are operative to derive from the unidirectional voltage impressed on the said input terminals an alternating voltage in the secondary winding 72 of transformer 71 which is of one phase or of opposite phase, depending upon the polarity of the unidirectional voltage. This derived alternating voltage is amplified by a vacuum tube amplifier contained within the device 4, which device may take the form of the vacuum tube amplifier and motor-drive system described in the copending application of Walter P. Wills filed December 1, 1941, and bearing Serial Number 421,173, Patent No. 2,423,540. The amplified quantity is employed to selectively control, during alternate intervals, the energization of the reversible electrical motors 5 and 6 for rotation in one direction or the other, according to the phase of the derived alternating potential.

The transformer 71 includes a primary winding 73 having a center tap 74. Primary winding 73 is wound on a core structure 75 on which the secondary winding 72 is also wound. The terminals of the secondary winding 72 are shunted by a tuning condenser 76 of suitable value and are connected to the vacuum tube amplifier contained in the device 4. A shield 77 is provided between the primary and secondary windings. All of the transformer parts are preferably located in a suitable housing which acts to shield the primary and secondary windings from external disturbing fields.

Vibrator 70 may be of the type described and claimed in the copending application of Frederick W. Side which was filed on December 1, 1941, and bears Serial Number 421,176, Patent No. 2,423,524, and comprises a vibrating reed 78 which normally engages relatively stationary contacts 79 and 80 but which during its vibration separates first from contact 79 and then from contact 80. The vibrating reed 78, however, is in engagement with one or the other of the contacts at all times and is vibrated under the influence of a winding 81. The terminals of winding 81 are connected to the terminals of the secondary winding 82 of a transformer 83 having additional secondary windings 84 and 85 and a line voltage primary winding 86, the terminals of which are connected to the alternating current supply conductors L¹ and L². A permanent magnet 87 is associated with the reed 78 and is provided for polarization and synchronization purposes in order to maintain the vibrations of the reed 78 in synchronism with the alternations of the voltage supply conductors L¹ and L². The permanent magnet 87 is connected to the shield 77 provided in the transformer 71, and both of these elements are connected to ground potential at G. The vibrator structure is also enclosed in a suitable housing which also serves the purpose of shielding the vibrating reed 78 and its associated contacts 79 and 80 from extraneous disturbing fields.

One end of the primary winding 73 of the transformer 71 is connected to the contact 79 of the vibrator 70 while the other end of the primary winding is connected to the vibrator contact 80. The center tap 74 is connected to the input terminal 68 of the electronic amplifier and motor-drive system 4 and the vibrating reed 78 is connected to the input terminal 67. Thus, a series connection is completed which includes the resistance 50 of the photoelectric cell preamplifier circuit 3, the vibrator 70 and the alternate halves of primary winding 73 of the transformer 71.

Each of the reversible motors 5 and 6 are of the rotating field type and are provided with power windings 88 and 89, respectively, and with control windings 90 and 91, respectively. The control windings 90 and 91 are arranged to be alternately connected to the output terminals 92 and 93 of the electronic amplifier and motor-drive system 4 and when so connected have a condenser 94 connected in parallel therewith. The power winding 88 of the motor 5 is connected through a condenser 95 to the alternating current supply conductors L¹ and L² and the power winding 89 of the motor 6 is connected through a condenser 96 to those supply conductors. Both of the power windings 88 and 89 are continuously energized during the operation of the apparatus. It will be apparent that suitable switching means, such as a switch S, may be provided between the alternating current supply conductors L¹ and L² and the source of alternating current so that the apparatus may be totally deenergized when the apparatus is not in operation.

When the current flow in the control winding of either of the motors 5 or 6 leads the current flow in the associated power winding, the corresponding motor rotates in one direction. When the current flow in the control winding lags that in the associated power winding rotation of the corresponding motor in the opposite direction is effected. When only the power windings are energized the motors remain at rest.

The electronic amplifier and motor-drive system 4 supplies energizing current to the control windings of motors 5 and 6, dependent upon the adjustment of switch 66, of one phase or of opposite phase according to the polarity of the unidirectional voltage impressed on the input terminals 67 and 68 from the resistance 50, and consequently, controls the selective energization of the motor 5 or 6 then having its control winding connected to the output terminals 92 and 93 for rotation in one direction or the other.

The general assembly of a preferred apparatus embodiment of the present invention is illustrated in Figs. 2 through 6. The electronic amplifier and motor-drive system 4, the resistance components 16, 26, 27, 30, 35, 36, 37, 38, 40, 41, 42, 50, 51 and 52, the manually operable vernier rheostat 34, the automatically operable vernier rheostat 44, the manually operable switches 39 and 43, the automatically operable switches 31, 65 and 66, and the battery 53 are all housed in a casing which is preferably formed of sheet material such as sheet metal. The photoelectric cell and other elements of the preamplifier 3 are desirably contained in a separate enclosure, not shown. Preferably the batteries 19, 23 and 28 are contained in a separate battery box.

The frame 115 is capable of being swung into and out of the case. When the frame 115 is swung into the case it is held in position by a latch arrangement 116.

A plate 117 is secured to the frame 115 at its upper end by means of screws 118. Extending from the plate 117 are two studs 119 and secured to the frame 115 are resilient studs 120. A chart plate 121 having keyhole slots cooperating with studs 119 and 120 is detachably held in place in front of the frame by these studs. A chart, upon which the absorption spectra characteristics of the compound or mixture flowing through the absorption cell 2 are to be recorded, is frictionally mounted in a manner described in detail in connection with Figs. 2 and 5, on a chart hub 123. The chart hub 123 is provided with an eccentrically located pin 124 which engages an eccentric hole in the chart. Rotation of the chart hub 123 is transmitted, therefore, to the chart 122. A pen arm 126 which is operated by the reversible motor 5 is provided with a fountain pen at the end thereof for recording on the chart the absorption spectra characteristic variations of the compound or mixture flowing through the absorption cell 2.

A pointer 128 is also provided which cooperates with the scale and is driven by the reversible motor 5 through a shaft 129 which is concentric with the chart hub 123. The pointer 128 is carried by a hub 130 which is detachably secured to the shaft 129. When the hub 130 is disengaged from the shaft it is rotatively supported by a bracket 131 which is pivotally mounted in the hinge pins for the frame 115. In order to replace the chart, the pointer 128 and the hub 130 are swung outwardly on the bracket 131. The chart is then taken off and replaced. When the chart is replaced the pen is restored to its normal position on the chart and the pointer and hub are swung back in place and secured to the concentrically located shaft.

Figure 2:
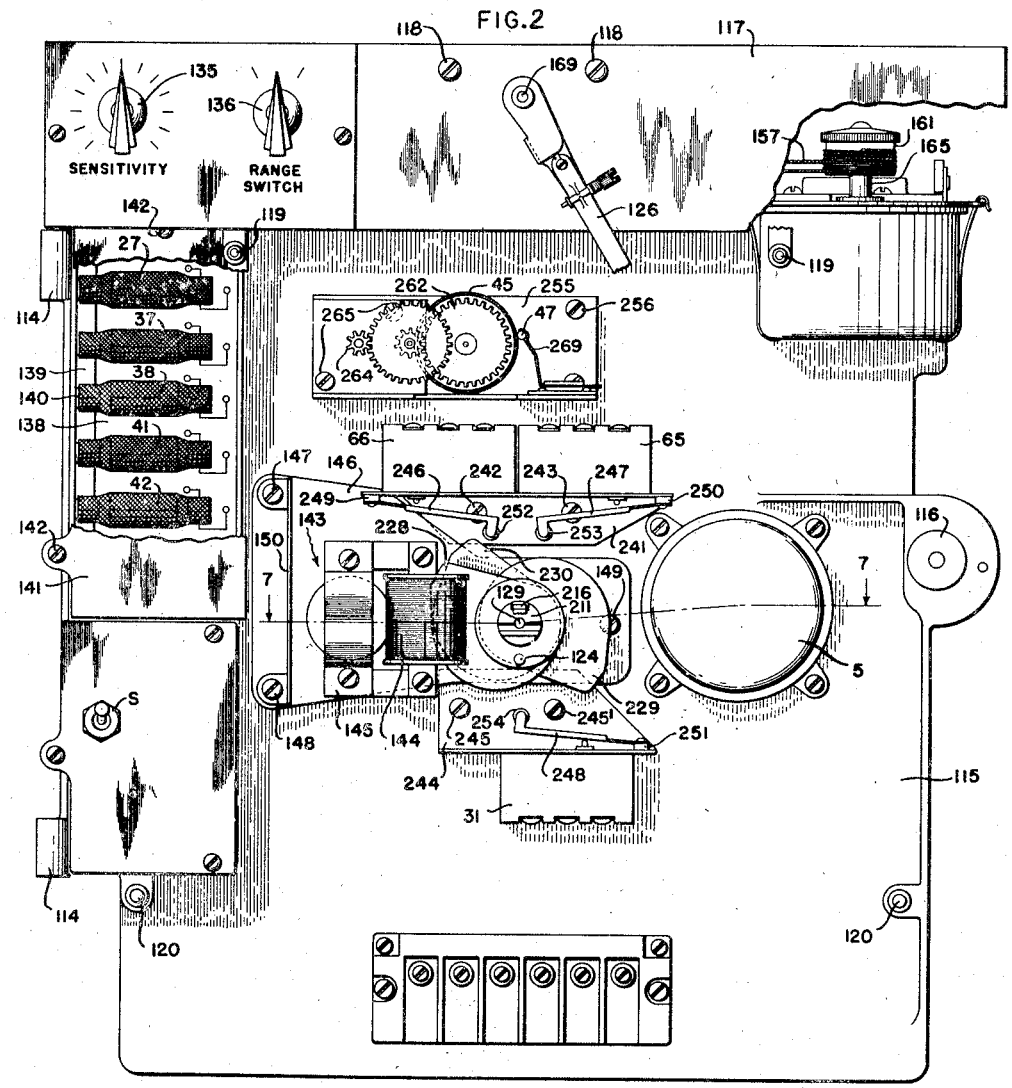
Fig. 2 is a front elevational view of the instrument with parts broken away and with the door, pointer and chart plate removed to show the front of the swinging frame.

The plate 117 carries the manually operable vernier rheostat 34 which, as may be seen in Fig. 2, is provided with a knob 135. The knob 135 is associated with a scale marked "Sensitivity." The plate 117 also carries the range changing switches 39 and 43 which are provided with a knob shown at 136 for changing the range of the instrument. The knob 136 is designated "Range switch."

Secured to the frame 115 and spaced forwardly on the frame is a panel 138 preferably made of insulating material upon which are mounted the resistances 27, 37, 38, 41 and 42. These resistances may be of the cylindrical type shown and described in the copending application of F. P.

Wagner filed May 1, 1941, and having Serial Number 391,319, Patent No. 2,357,241. The panel 138 carries a bracket 139 provided with lugs 140 to hold the resistances in place. The resistances are provided with leads which are secured to suitable terminals on the panel 138 to facilitate making the various electrical connections. The panel 138 and the associated resistances are enclosed by a cover 141 secured to the frame 115 by means of screws 142. The cover acts as a shield to reduce the effects of stray electrical fields on the resistances and thereby upon the operation of the apparatus.

The chart drive motor generally designated at 143 is provided with a field winding 144 and a core structure 145 and is mounted in any convenient manner on a plate 146 which, in turn, is secured to the frame 115 by means of screws 147, 148 and 149. The chart drive motor 143 may be a Warren Telechron motor of the synchronous type, and in addition to rotating the chart 122, is utilized to actuate the switches 31, 65 and 66 in a manner to be described. In addition to securing the plate 146 to the frame 115, the screws 147 and 148 carry a shield 150 to reduce further the tendency of any stray electrical current or fields emanating from the chart drive motor 143 to adversely affect the resistances 27, 31, 38, 41 and 42.

The reversible motor 5 is carried on the front of the frame 115 and its shaft carrying the drive pinion 151 extends through the frame 115 to the back of the frame. Fig. 3 shows a view of the back of the frame 115. At the top right hand corner of Fig. 3 the manually operable vernier rheostat 34 and the switches 39 and 43 are shown mounted on the plate 117. The resistance 35 is located to the right of the vernier rheostat 34.

A support for the contact 33 is mounted on the lower end of shaft 165 and consists of an angle member 167 which extends beyond the edge of the support 165 and upwardly parallel to the side of the latter. This angle member 167 has attached to it a spring 168 that is provided with a slot in which the contact 33 is located. It will be seen that as the motor 5 rotates, it operates through the cable drum 154, the cable 157, the pulleys 158, 159 and 160 and the cable drum 161 to move the contact 33 around the outer edge of the support 166. The contact 33 is held by the spring 168 in engagement with the slidewire resistance 16 and the collector bar 16' so that as it rotates, more or less of the potential drop produced across the slidewire resistance 16 is connected in opposition to the potential drop created across the resistance 15 in the preamplifier circuit 3 to rebalance the instrument.

The motor 5 also serves to drive the pen 126 which is employed to make a record of the absorption spectra characteristic variations of the compound or mixture in the absorption cell 2 as the motor 5 rotates. To this end there is provided the gear sector 156 which, as shown, is supported for angular motion by a shaft 169. This gear sector member 156 has gear teeth 170 formed on its lower surface and which mesh with the pinion 155. The pinion 155 is carried by the shaft 129 and serves to angularly deflect the gear sector 156 as the motor rotates. The pen arm 126 is attached at its upper end to the shaft 169, being rigid therewith, and accordingly moves with the gear sector 156 as the latter is driven by the motor 5.

Figure 4:
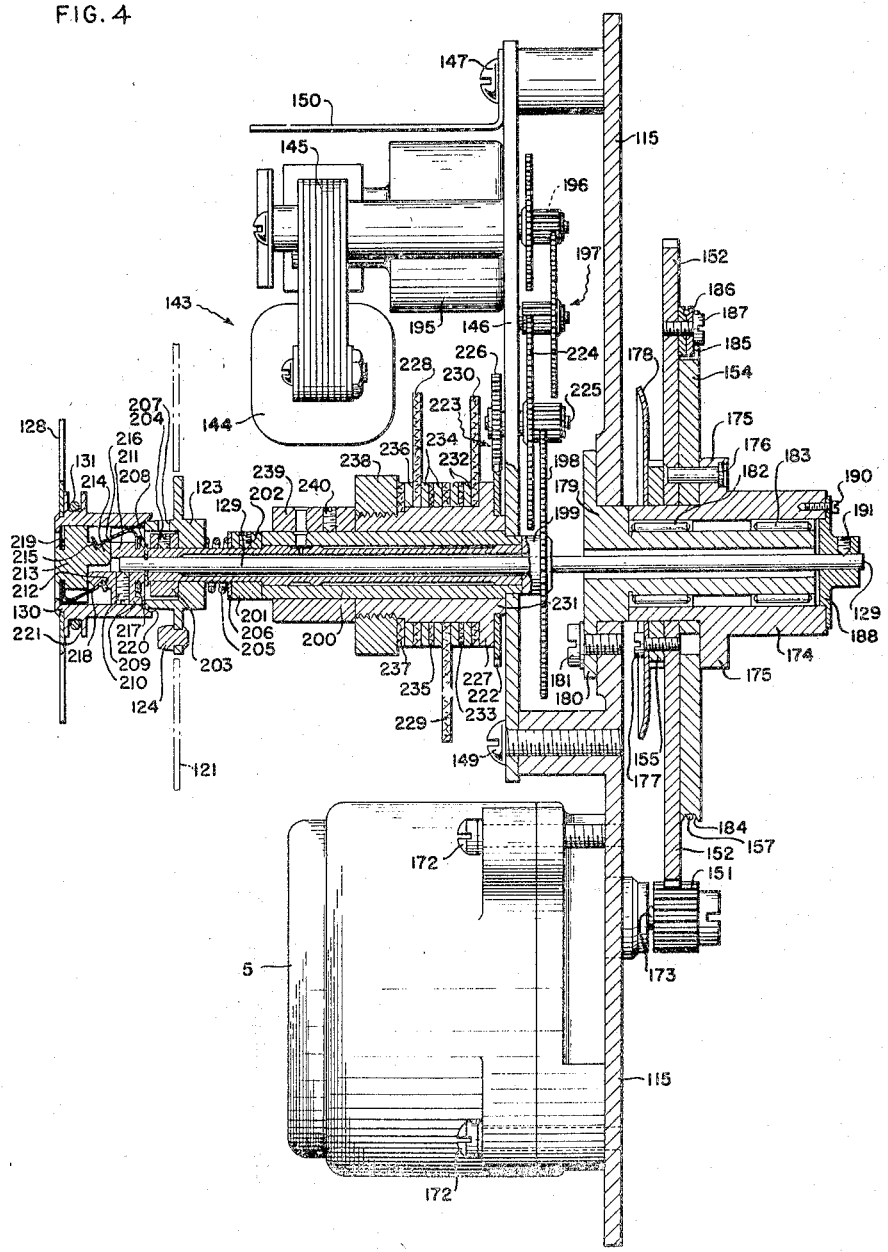
Fig. 4 is a horizontal sectional view through the swinging frame taken substantially on the line 7—7 of Figs. 2 and 3.

Fig. 4 is a sectional view taken substantially along the lines 4—4 of Figs. 2 and 3 and illustrates the manner in which the reversible motor 5 drives the pointer 128 and the gear sector 156, and the manner in which the chart motor 143 drives the chart 122. Fig. 4, in conjunction with Fig. 2, also illustrates the manner in which the chart motor 143 operates the switches 31, 65 and 66 for alternately adjusting the instrument to its normal running and standardizing conditions.

As shown, the reversible motor 5 is mounted on the frame 115 by means of screws 172. It includes a reduction gearing (not shown) for operating a shaft 173 which extends through the frame 115 and which carries the pinion 151. The pinion 151 meshes with the gear 152 the latter of which is mounted on a cylindrical hub 174. The cylindrical hub 174 is provided with a flange 175. Three rivets 176, only one of which is shown in Fig. 4, rigidly secure the flange 175, the gear 152 and the cable drum 154 together. Three screws 177, only one of which is shown in Fig. 4, secure a plate 178 and the gear 155 to the gear 152. Thus the gear 152, the gear 155, the cable drum 154, and the cylindrical hub 174 are all fastened together for simultaneous rotation. The gear 155 meshes with and operates the gear sector 156.

A trunnion 179 having a flange 180 is secured to the frame 115 by means of three screws 181, only one of which is shown in Fig. 4. The trunnion 179 is concentric with the cylindrical hub 174. Located between the trunnion 179 and the cylindrical hub 174 are two sets of needle bearings 182 and 183 which provide substantially frictionless rotation of the cylindrical hub 174, the cable drum 154 and the gears 152 and 155.

The cable drum 154 is provided with a circumferential groove 184 in which the cable 157 rides. The cable drum 154 is provided with a notch 185 in which is located a two-piece clamping means 186. The cable is secured between the two pieces of the clamping means 186 which, in turn, is secured to the gear 152 by means of a screw 187. By tightening down on the screw 187 the cable 157 is clamped with respect to the cable drum 154 so that slipping of the cable 157 with respect to the cable drum 154 is prevented.

Located on the end of the cylindrical hub 174 is a flanged member 188 which, as shown in Fig. 3, is provided with a slot 189 and a screw 190 which extends through the slot for adjustably securing the flanged member 188 to the cylindrical hub 174. By loosening the screw 190 the flanged member 188 may be relatively positioned with respect to the cylindrical hub 174, and by tightening down on the screw 190 the flanged member 188 may be secured to the cylindrical hub 174 in a desired position. One end of the shaft 129 is secured to the flanged member 188 by means of a set screw 191 and the other end of the shaft extends forwardly for the purpose of operating the pointer 128. Hence, the pointer 128 is operated from the gear 152 and the relative position of the pointer 128 with respect to the gear 152 may be adjusted by the slot and screw connection 189, 190 for calibration purposes.

The chart motor 143, in addition to rotating the gear 198 and causing rotation of the chart 122, also rotates a gear 222 by means of a gear train 223 for automatically operating the switches 31, 65 and 66 as required to periodically effect the desired standardizing or calibrating adjustments of the apparatus. To this end the gear 224 of the gear train 197 is provided with a shaft 225 which extends through the plate 146 and is provided with a pinion 226 on the end which is on the same side of the plate 146 as that on which the clock 143 is mounted. The pinion 226 operates through the gear train 223 to rotate the gear 222.

The gear 222 is staked to a flange which is provided near one end of a flanged sleeve 227. The flanged sleeve 227 is mounted for rotation on the sleeve bearing 200 and carries three spaced apart and suitably shaped fibre cams 228, 229 and 230. The end 231 of the flanged sleeve 227 serves as a bearing surface to maintain the gear 222 in spaced apart relation from the plate 146. A knurled nut 238 is screwed on the other end of the sleeve 227. Located between the flange of the flanged sleeve 227 and the knurled nut 238 are the cam 230, two metallic spring washers 232 separated by a fibre washer 233, the cam 229, two metallic spring washers 234 separated by a fibre washer 235, the cam 228, a metallic washer 236, and a fibre washer 237. The knurled nut 238 when screwed on the threaded end of the flanged sleeve 227 holds the cam assembly including the cams and the spacing washers rigidly together. A collar 239 which is provided with a set screw 240 is mounted on the sleeve bearing 200 on the other side of the knurled nut 238 and is provided to prevent axial movement of the cam assembly. To this end the set screw 240 is tightened down into engagement with the sleeve bearing 200. It will be evident that the relative positions of the cams 228, 229 and 230 may be adjusted, as desired, merely by loosening the knurled nut 238 and set screw 240 and then adjusting the cams to the desired positions after which the knurled nut 238 and set screw 240 may again be tightened.

Referring now to Fig. 2 it will be noted that the cams 228, 229 and 230 are disposed in cooperative relation with the switches 66, 31 and 65, respectively. Switches 66, 31 and 65 are shown as of the type known and sold commercially as snap acting or micro switches. The switches 66 and 65 are mounted on an angle bracket 241 which is mounted on the frame 115 by means of screws 242 and 243. The switch 31 is mounted on an angle bracket 244 which is mounted on the frame 115 by means of screws 245 and 245'. The switches 66, 65 and 31 are provided with resilient lever arms 246, 247 and 248, respectively, which are mounted on the associated angle brackets by means of screws 249, 250 and 251, respectively. The resilient lever arms 246, 247 and 248 are provided with rollers 252, 253 and 254, respectively, which are arranged to be engaged by the associated cams 228, 230 and 229 as the cams rotate to deflect the resilient lever arms 246, 247 and 248 as required to actuate the switches 66, 65 and 31. It will be noted that the lever arms 246 and 247 when moved upwardly from the positions shown are arranged to push the associated operating pins of the switches 66 and 65 to operate those switches, and that the lever arm 248 when deflected in a downward direction from the position shown is adapted to push the operating pin of the switch 31 to operate the latter.

The cams 228, 229 and 230 are so configured and positioned relatively to each other and to the rollers 252, 254 and 253, respectively, that as the cams are rotated in a counter-clockwise direction the switch 66 is first operated, and thereafter, the switches 31 and 65 are operated substantially simultaneously. Upon further rotation of the cams, the switch 66 is the first to resume its original condition and thereafter the switches 31 and 65 assume their original conditions substantially simultaneously. This sequence of operation of these switches 31, 65 and 66 is in accordance with desired sequence of switch operation explained hereinbefore for accomplishing the desired standardizing or calibrating adjustments during intervals alternating with those in which the apparatus is in its normal running condition without causing any adverse action upon the operation of the apparatus.

The details of construction of the automatically operable vernier rheostat 44 are shown in Figs. 2, 5 and 6. The vernier rheostat 44 is supported by an angle bracket 255 which, in turn, is mounted on the frame 115 by means of four screws 256. A stud 257 which is staked to and rigidly supported by the vertical section of the angle bracket 255, as seen in Fig. 5, is employed to provide a bearing surface for two discs 258 and 259. The diameter of the stud 257 from the vertical section of the angle bracket 255 to the face of the disc 258 which is remote from the angle bracket is relatively large and is the diameter shown in full lines, while the diameter of the stud 257 from that face of the disc 258 to the end of the stud is considerably smaller as is shown in Fig. 5 by means of the dotted lines 257'. A collar 260 provided with a set screw 260' is provided on the larger diameter portion of the stud 257 to provide a stop for the disc 258. The disc 258 is mounted for rotation on the end of the larger diameter section of the stud 257.

A flanged sleeve 261 is supported for rotation on the portion of stud 257 of smaller diameter. The disc 259 is forced fit over the sleeve 261 into engagement with the flange of the flanged sleeve 261 in such manner that the flange of the flanged sleeve acts to maintain the discs 258 and 259 in spaced apart relation. A gear 262 is staked to the end of the flanged sleeve 261 and is arranged to be rotated by a gear train 263. The gear train 263 is actuated by the pinion 264 which is attached to the shaft 6' of the standardizing or calibrating motor 6. The motor 6, as shown, is mounted on the vertical section of the angle bracket 255 by means of two bolts 265 which extend through the frame of the motor 6 and are screwed into tapped holes in the vertical section of the angle bracket 255.

The fine or vernier resistance 45 is mounted on the disc 259 while the coarse resistance 46 is mounted on the disc 258. As may be seen by reference to Fig. 6, the disc 258, upon which the coarse resistance 46 is mounted, is driven by the disc 259, upon which the fine resistance 45 is mounted, through a lost motion connection comprising a pin 266 which extends from the disc 259 through an arcuate slot 267 formed in the disc 258. The peripheral surfaces of the resistances 45 and 46 are engaged by their associated contacts 47 and 48 which are suitably mounted on the end of the individual resilient spring members 268 and 269. The spring members 268 and 269 are mounted on a metallic plate 270 which, in turn, is mounted on the horizontal section of the angle bracket 255 by means of screws 271. The spring members 268 and 269 are insulated from each other and from the plate 270 in any suitable manner. The engagement between the contacts 47 and 48 and the resistances 45 and 46 forms the electrical connection from the external circuit to the vernier rheostat 44 through the spring members 268 and 269. Preferably, the planes in which the circular resistances 45 and 46 lie are not parallel to the planes in which the discs 258 and 259 lie so that upon rotation of the discs 258 and 259 a wiping action will be produced between the resistances 45 and 46 and their individually associated contacts 47 and 48 which will serve to maintain good, clean contact between these elements.

The arrangement of the resistance elements 50, 51 and 52 within the instrument case, as previously noted, together with the inclusion of other of the preamplifier circuit resistances, as noted hereinbefore, within the instrument case reduces to an appreciable extent and substantially eliminates A. C. and D. C. stray current effects which would otherwise adversely affect the operation of the instrument.

It will be recognized that the reversible motor 5 may be employed to operate suitable control means, such as disclosed in the aforesaid Wills application, for governing the application of a suitable agent to the compound or mixture under analysis as required to maintain at a constant value the absorption spectra characteristics of the compound or mixture, and hence, to maintain constant a desired quality or quantity thereof.

While in accordance with the provisions of the statutes, we have illustrated and described the best form of our invention now known to us, it will be apparent to those skilled in the art that changes may be made in the form of the apparatus disclosed without departing from the spirit of our invention as set forth in the appended claims, and that in some cases certain features of our invention may sometimes be used to advantage without a corresponding use of other features.

Having now described our invention, what we claim as new and desire to secure by Letters Patent is:

1. The combination with a normally balanced measuring circuit having a running condition and a standardizing condition and comprising a variable source of current adapted to unbalance said circuit and a slidewire resistance adapted to rebalance said circuit, a variable resistance connected in said measuring circuit to compensate for circuit unbalancing factors other than normal variations in said variable source of current, a reversible motor to actuate said slidewire resistance and a separate reversible motor to actuate said variable resistance, means connected to said measuring circuit and responsive to the state of balance of said circuit adapted to control both of said motors for rotation during alternate intervals, switching means to render said responsive means operative to control one or the other of said motors for rotation, switching means to adjust said measuring circuit from its running condition to its standardizing condition, a motor, and a plurality of cams driven by said motor and adjustably secured in relation to each other so that one of said cams first operates said first mentioned switching means to render said responsive means operable to control said second mentioned motor and then another of said cams actuates said second mentioned switching means and thereafter said one of said cams operates said first mentioned switching means to render said responsive means operable to control said first mentioned motor and then said another of said cams actuates said second mentioned switching means to adjust said measuring circuit to its running condition.

2. The combination with a normally balanced measuring circuit comprising an electrical valve having an input circuit controlled by said measuring circuit and an output circuit, a photoelectric cell to unbalance said measuring circuit in accordance with the illumination thereof, said measuring circuit being characterized in that an extraneous factor other than changes in the illumination of said photoelectric cell tends to effect unbalance thereof, a slidewire resistance to rebalance said measuring circuit, a reversible motor to control said slidewire resistance, means connected to said output circuit to control said reversible motor, means to control said input circuit to compensate for changes therein due to said extraneous factors including an adjustable resistance connected in said measuring circuit and to the input circuit of said electrical valve, a second reversible motor controlled by said first mentioned means to adjust said adjustable resistance, means to cut off the illumination of said photoelectric cell, means to render said slidewire resistance inoperative to control said input circuit and to impress a predetermined potential on said input circuit, and periodically operable means to first render said first mentioned means operable to control said second mentioned motor and then to actuate said third and fourth mentioned means.

3. The combination with a normally balanced measuring circuit comprising an electrical valve having an input circuit controlled by said measuring circuit and an output circuit, a photoelectric cell to unbalance said measuring circuit in accordance with the illumination thereof, said measuring circuit being characterized in that an extraneous factor other than changes in the illumination of said photoelectric cell tends to effect unbalance thereof, a slidewire resistance to rebalance said measuring circuit, a reversible motor to control said slidewire resistance, means connected to said output circuit to control said reversible motor, means to control said input circuit to compensate for changes therein due to said extraneous factors including an adjustable resistance connected in said measuring circuit and to the input circuit of said electrical valve, a second reversible motor controlled by said first mentioned means to adjust said adjustable resistance, means to cut off the illumination of said photoelectric cell, means to render said slidewire resistance inoperative to control said input circuit and to impress a predetermined potential on said input circuit, and periodically operable means to first render said first mentioned means operable to control said second mentioned motor and then to actuate said third and fourth mentioned means and operative thereafter to first render said first mentioned means operative to control said first mentioned motor and then to actuate said third and fourth mentioned means to restore the illumination of said photoelectric cell and to render said slidewire resistance operable to control said input circuit.

4. Measuring apparatus including a normally balanced measuring circuit and a photoelectric cell adapted to be illuminated in accordance with the changes in magnitude of a variable condition to unbalance said circuit to an extent corresponding with such change, a resistance in said circuit adapted to be adjusted to rebalance said circuit, a reversible motor to adjust said resistance, electrical valve means having a control electrode and cathode included in an input circuit to which said measuring circuit is connected and having an output circuit through which a current of predetermined value flows when said measuring circuit is balanced but which increases or decreases from said value accordingly as said measuring circuit is unbalanced in one direction or the other, said measuring circuit being characterized in that an extraneous factor other than changes in the illumination of said photoelectric cell tends to effect unbalance thereof, compensating means for said extraneous factor and operative independently of said adjustable resistance to adjust the potential of the control electrode of said electrical valve means at which said predetermined value of current flows in said output circuit including a second adjustable resistance connected in said measuring circuit between the control electrode and cathode of said electrical valve means and a first switching means to render said first mentioned resistance inoperative to control said input circuit and to connect the control electrode of said electrical valve means to a point of predetermined potential in said measuring circuit, a second reversible motor to adjust said second adjustable resistance, means responsive to the magnitude of current flow in said output circuit adapted to control the energizations of both of said motors for rotation, second switching means to selectively render said responsive means operative to control one of said motors for rotation, means including a third switching means to cut off the illumination of said photoelectric cell, and periodically operable means to first actuate said second switching means and then said first and third switching means to render said second motor operative to adjust said second adjustable resistance with the illumination cut off from said photoelectric cell and operative thereafter to first actuate said second switching means and then said first and third switching means to render said first motor operative to adjust said first adjustable resistance in accordance with the illumination of said photoelectric cell.

5. Measuring apparatus including a circuit having connected in series therein a resistance, a voltage source, and a photoelectric cell adapted to be illuminated in accordance with the variations in magnitude of a variable condition, an electrical valve having an anode, a control electrode and a cathode, a slidewire resistance and a contact engaging said slidewire resistance, a series circuit between the control electrode and cathode of said valve including a connection from said control electrode to one end of said first mentioned resistance, a connection from the other end of said resistance to said contact, and a connection from one end of said slidewire resistance to said cathode, means to establish a potential drop across said slidewire resistance having a polarity opposing the potential drop produced across said first mentioned resistance by the flow of current in said first mentioned circuit, a circuit including the anode and cathode of said valve through which current of a predetermined value flows when the resultant of the potential drops in said second mentioned circuit is a predetermined value but which increases or decreases as said resultant deviates in one direction or the other from said predetermined value, said anode current flow tending to vary due to a factor other than change in the illumination of said photoelectric cell or change in position of said slidewire contact, a reversible motor to adjust said contact along said slidewire resistance, means responsive to the magnitude of said anode current flow adapted to control the energization of said reversible motor for rotation as required to maintain said anode current flow constant, compensating means for said factor and operative independently of said contact and slidewire resistance to adjust the potential of the control electrode of said valve to the value at which said predetermined value of anode current flows including an adjustable resistance connected in said measuring circuit between said other end of said first mentioned resistance and the cathode of said electrical valve and a first switching means to connect said other end of said first mentioned resistance to a potential point having the same potential as said contact when the latter is in a predetermined position along said slidewire resistance, a second reversible motor to adjust said adjustable resistance, second switching means to render said responsive means operative to control said second reversible motor for rotation during intervals alternating with those in which said first mentioned motor is controlled for rotation, means including a third switching means to cut off the illumination to said photoelectric cell, and periodically operable means to first actuate said second switching means and then said first and third switching means to render said second mentioned motor operative to adjust said adjustable resistance and operative thereafter to first actuate said second switching means and then said first and third switching means to render said first mentioned motor operative to adjust said contact along said slidewire resistance.

6. Measuring apparatus including a circuit having connected in series therein a resistance, a voltage source, and a photoelectric cell adapted to be illuminated in accordance with the variations in magnitude of a variable condition, an electrical valve having an anode, a control electrode and a cathode, a slidewire resistance and a contact engaging said slidewire resistance, a series circuit between the control electrode and cathode of said valve including a connection from said control electrode to one end of said first mentioned resistance, a connection from the other end of said resistance to said contact, and a connection from one end of said slidewire resistance to said cathode, means to establish a potential drop across said slidewire resistance having a polarity opposing the potential drop produced across said first mentioned resistance by the flow of current in said first mentioned circuit, a circuit including the anode and cathode of said valve through which current of a predetermined value flows when the resultant of the potential drops in said second mentioned circuit is a predetermined value but which increases or decreases as said resultant deviates in one direction or the other from said predetermined value, a reversible motor to adjust said contact along said slidewire resistance, said anode current flow tending to vary due to a factor other than change in the illumination of said photoelectric cell or change in position of said slidewire contact, means responsive to the magnitude of said anode current flow to control the energization of said reversible motor for rotation as required to maintain said anode current flow constant, compensating means for said factor including an adjustable resistance connected in said measuring circuit between said other end of said first mentioned resistance and the cathode of said electrical valve to vary the potential of said other end of said first mentioned resistance, a second reversible motor to adjust said adjustable resistance, and periodically operated means to render said responsive means operative to control the energization of said second reversible motor for rotation.

7. Measuring apparatus including a circuit having connected in series therein a resistance, a voltage source, and a photoelectric cell adapted to be illuminated in accordance with the variations in magnitude of a variable condition, an electrical valve having an anode, a control electrode and a cathode, a slidewire resistance and a contact engaging said slidewire resistance, a series circuit between the control electrode and cathode of said valve including a connection from said control electrode to one end of said first mentioned resistance, a connection from the other end of said resistance to said contact, and a connection from one end of said slidewire resistance to said cathode, means to establish a potential drop across said slidewire resistance having a polarity opposing the potential drop produced across said first mentioned resistance by the flow of current in said first mentioned circuit, a circuit including the anode and cathode of said valve through which current of a predetermined value flows when the resultant of the potential drops in said second mentioned circuit is a predetermined value but which increases or decreases as said resultant deviates in one direction or the other from said predetermined value, means responsive to the magnitude of said anode current flow to adjust said contact along said slidewire resistance as required to maintain said anode current flow constant, said anode current flow tending to vary due to a factor other than change in the illumination of said photoelectric cell or change in position of said slidewire contact, compensating means for said factor including an adjustable resistance connected in said measuring circuit between said other end of said first mentioned resistance and the cathode of said electrical valve to vary the potential of said other end of said first mentioned resistance, and means operative under predetermined conditions of said first mentioned circuit and responsive to the magnitude of said anode current flow to adjust said adjustable resistance.

8. Measuring apparatus including a circuit having connected in series therein a resistance, a voltage source, and a photoelectric cell adapted to be illuminated in accordance with the variations in magnitude of a variable condition, an electrical valve having an anode, a control electrode and a cathode, a slidewire resistance and a contact engaging said slidewire resistance, a series circuit between the control electrode and cathode of said valve including a connection from said control electrode to one end of said first mentioned resistance, a connection independent of said voltage source from the other end of said resistance to said contact, and a connection from one end of said slidewire resistance to said cathode, a voltage source separate from said first mentioned voltage source to establish a potential drop across said slidewire resistance having a polarity opposing the potential drop produced across said first mentioned resistance by the flow of current in said first mentioned circuit, a circuit including the anode and cathode of said valve through which current of a predetermined value flows when the resultant of the potential drops in said second mentioned circuit is a predetermined value but which increases or decreases as said resultant deviates in one direction or the other from said predetermined value, means to derive from said anode current flow a fluctuating current of one phase or of opposite phase depending upon the direction of change of said current flow, and means actuable in one direction or the other according to the phase of said fluctuating current to adjust said contact along said slidewire resistance.

9. Measuring apparatus including a normally balanced measuring circuit and a current varying device responsive to change in the magnitude of a variable condition to unbalance said circuit to an extent corresponding with said change, said measuring circuit being characterized in that a factor other than normal variations in the operation of said current varying device tends to effect unbalance thereof, an impedance in said circuit adapted to be adjusted to rebalance said circuit, a reversible electrical motor to adjust said impedance, compensating means for said factor including a variable impedance connected in said measuring circuit and a reversible motor to adjust said variable impedance, an electronic preamplifier having an input circuit to which said measuring circuit is connected by a substantially constant impedance and having an output circuit through which unidirectional current of a predetermined value flows when said measuring circuit is balanced but which increases or decreases from said value accordingly as said measuring circuit is unbalanced in one direction or the other, means to derive from said unidirectional current flow a fluctuating current of one phase or of the opposite phase depending upon the direction of deviation of said current flow from said predetermined value, electronic amplifying to amplify said fluctuating current, and means including motor control means responsive to the phase of said amplified fluctuating current to alternately control said motors.

10. The combination of claim 9 wherein the means to derive from said unidirectional current flow a fluctuating current flow of one phase or of opposite phase comprises a resistance through which the said current flow is passed to create a potential drop across said resistance of magnitude corresponding to the magnitude of said current flow, means to oppose said potential drop to an electromotive force having a magnitude equal to said potential drop when said measuring circuit is balanced to derive a resultant potential of one polarity or the other accordingly as said potential drop is greater or less than said electromotive force, and a circuit upon which said resultant potential is impressed including means operable to interrupt said circuit at regular frequency.

11. Measuring apparatus including a normally balanced measuring circuit and a current varying device responsive to change in magnitude of a variable condition to unbalance said circuit to an extent corresponding with said change, said measuring circuit being characterized in that a factor other than normal variations in the operation of said current varying device tends to effect unbalance thereof, an impedance in said circuit adapted to be adjusted to rebalance said circuit, compensating means for said factor including a variable impedance connected in said measuring circuit, electrical valve means having an input circuit to which said measuring circuit is connected by a substantially constant impedance and having an output circuit through which unidirectional current of a predetermined value flows when said measuring circuit is balanced but which increases or decreases from said value accordingly as said measuring circuit is unbalanced in one direction or the other, means to derive from said unidirectional current flow a fluctuating current of one phase or of the opposite phase depending upon the direction of deviation of said current flow from said predetermined value, and means including phase responsive means controlled by said fluctuating current to alternately adjust said adjustable impedance and said variable impedance.

12. Measuring apparatus including a circuit having connected in series therein a resistance, a voltage source and a photoelectric cell adapted to be illuminated in accordance with the variations in magnitude of a variable condition, an electrical valve having an anode, a control electrode and a cathode, a slidewire resistance and a contact engaging said slidewire resistance, means to establish a substantially constant potential drop across said slidewire resistance, a connection from one end of said first mentioned resistance directly to said contact, a connection from the other end of said first mentioned resistance to the control electrode of said valve, a connection from one end of said slidewire resistance to the cathode of said valve, a circuit including the anode and cathode of said valve, and means controlled by the flow of current through said last mentioned circuit to adjust said contact along said slidewire resistance as required to maintain said current flow at a predetermined value.

13. Measuring apparatus including a circuit having connected in series therein a resistance, a voltage source and a photoelectric cell adapted to be illuminated in accordance with the variations in magnitude of a variable condition, an electrical valve having an anode, a control electrode, and a cathode, a slidewire resistance and a contact engaging said slidewire resistance, means to establish a potential drop across said slidewire resistance including a variable resistance, range changing means including means to add resistance in series with said slidewire resistance and to simultaneously add resistance in parallel with said slidewire resistance as required to maintain the total resistance constant, a connection from one end of said first mentioned resistance to said contact, a connection from the other end of said first mentioned resistance to the control electrode of said valve, a connection from one end of said slidewire resistance to the cathode of said valve, and means connected to the anode and cathode of said valve to adjust said contact along said slidewire resistance.

14. Measuring apparatus including a circuit having connected in series order therein a high resistance and two relatively low resistances and also including in series therein voltage source and a photoelectric cell adapted to be illuminated in accordance with the variations in magnitude of a variable condition, a slidewire resistance and a contact engaging said slidewire resistance, means to establish a potential drop across said slidewire resistance, means associated with said last mentioned means to establish a point of fixed potential, switching means operative in one position to connect the junction point of one terminal of said high resistance and one of said low resistances to said contact and operative in another position to connect said junction point to said point of fixed potential, a connection including a variable resistance from the junction point of said low resistances to one end of said slidewire resistance, a connection including a voltage source from the other end of said other low resistance to the other end of said slidewire resistance, and voltage responsive means connected to said other terminal of said slidewire resistance and the other terminal of said high resistance.

15. The combination including a measuring circuit having connected in series order therein a high resistance and two relatively low resistances and also including in series therein a voltage source and a photoelectric cell adapted to be illuminated in accordance with the variations in magnitude of a variable condition, a slidewire resistance and a contact engaging said slidewire resistance, means to establish a potential drop across said slidewire resistance, means associated with said last mentioned means to establish a point of fixed potential, switching means operative in one position to connect the junction point of one terminal of said high resistance and one of said low resistances to said contact and operative in another position to connect said junction point to said point of fixed potential, a connection including a variable resistance from the junction point of said low resistances to one end of said slidewire resistance, a connection including a voltage source from the other end of said other low resistance to the other end of said slidewire resistance, a pre-amplifier circuit having one input terminal connected to said other terminal of said slidewire resistance and having the other input terminal connected to the other terminal of said high resistance and having an output circuit, and means connected to said output circuit including an electronic amplifier having an output circuit and motive means responsive to current flow in the output circuit of said electronic amplifier to alternately adjust said contact along said slidewire resistance and to vary said variable resistance depending upon the position of said switching means.

16. The combination of claim 15 wherein said last mentioned means is contained in an enclosure in which said two relatively low resistances, said slidewire resistance, said switching means and said variable resistance are contained in close proximity, and said photoelectric cell and said high resistance are contained within a separate enclosure.

17. The combination with a normally balanced measuring circuit having a running condition and a standardizing condition and comprising an unstable variable source of current adapted to unbalance said circuit, a slidewire resistance adapted to rebalance said circuit and variable resistance to compensate for circuit unbalancing factors due to instability of said variable source of current, reversible motive means to actuate said slidewire resistance and separate reversible motive means to actuate said variable resistance, means connected to said measuring circuit and responsive to the state of balance of said circuit adapted to control both of said motive means for operation during alternate intervals, switching means to render said responsive means operative to control one or the other of said motive means for operation, switching means to adjust said measuring circuit from its running condition to its standardizing condition, a motor, and a plurality of cams driven by said motor and adjustably secured in relation to each other so that one of said cams operates said first mentioned switching means to render said responsive means operable to control said second mentioned motive means and then another of said cams actuates said second mentioned switching means.

18. Means for calibrating or standardizing a measuring instrument including a normally balanced measuring circuit, a device responsive to change in the magnitude of a variable condition to unbalance said circuit to an extent corresponding to said change, an adjustable impedance connected in said measuring circuit and adapted to be adjusted to rebalance said circuit upon unbalance thereof, said impedance having a predetermined adjustment when said circuit is balanced and the magnitude of said variable condition is at a predetermined value, said measuring circuit being characterized in that a factor of said device other than normal variations in the response of said device to said condition tends to disturb the calibration of said circuit and thereby require an adjustment of said impedance other than said predetermined adjustment when said circuit is balanced and the magnitude of said condition is at said predetermined value, a variable impedance connected in said measuring circuit for compensatng for said factor, means responsive to the state of balance of said measuring circuit, a motor having mechanical connection with said adjustable impedance to rebalance said circuit, a second motor having mechanical connection with said variable impedance to compensate said measuring circuit, a first micro-switch for disconnecting one of said motors and for connecting the other of said motors to said means responsive to the state of balance of said measuring circuit whereby the connected motor is energized by said means so long as said circuit is unbalanced, a second micro-switch for connecting said measuring circuit into a measuring position or into a calibrating or standardizing position, a third motor, and a pair of cams driven by said third motor in a cycle wherein one of said cams actuates said first micro-switch to disconnect said first motor and to connect said second motor and then said second cam actuates said second micro-switch to move said measuring circuit into calibrating or standardizing position and then said first cam moves said first micro-switch to disconnect said second motor and to connect said first motor and then said second cam moves said second micro-switch to connect said measuring circuit in measuring position.

WALTER P. WILLS.
LEONARD STANTON.

REFERENCES CITED

The following references are of record in the file of this patent:

UNITED STATES PATENTS

| Number | Name | Date |
|---|---|---|
| 2,109,222 | Ryder | Feb. 22, 1938 |
| 2,245,033 | Harrison | June 10, 1941 |
| 2,306,479 | Jones | Dec. 29, 1942 |
| 2,363,473 | Ryder | Nov. 21, 1944 |
| 2,385,481 | Wills | Sept. 25, 1945 |